United States Patent [19]

Iinuma

[11] Patent Number: 5,225,795
[45] Date of Patent: Jul. 6, 1993

[54] DIGITAL QUADRATURE MODULATOR

[75] Inventor: Toshinori Iinuma, Gifu, Japan

[73] Assignee: Sanyo Electric Co., Ltd., Japan

[21] Appl. No.: 823,246

[22] Filed: Jan. 21, 1992

[30] Foreign Application Priority Data

Jan. 23, 1991 [JP] Japan ............... 3-6458

[51] Int. Cl.$^5$ ............... H03C 1/00; H03C 3/00; H03C 5/00
[52] U.S. Cl. ............... 332/100; 332/103; 332/117; 332/144; 332/149; 375/62; 375/64; 375/67
[58] Field of Search ............ 332/100, 103, 104, 117, 332/144, 145, 149, 107, 170; 375/39, 42, 45-58, 62, 64, 67

[56] References Cited

U.S. PATENT DOCUMENTS 4,584,540  4/1986  DuBose et al. ............... 332/104 X
5,091,705  2/1992  Hiramatsu et al. ............... 332/103

OTHER PUBLICATIONS

A. Yongacoglu et al., "Differential Detection of GMSK Using Decision Feedback", *IEEE Transactions on Communications*, vol. 36, No. 6, Jun. 1988, pp. 641-649.
K. Murota et al., "GMSK Modulation for Digital Mobile Radio Telephony", *IEEE Transactions on Communications*, vol. COM-29, No. 7, Jul. 1981, pp. 1044-1050.

Primary Examiner—Mis David
Attorney, Agent, or Firm—Peter L. Michaelson

[57] ABSTRACT

A digital quadrature modulator having a first storage device for receiving an I phase component of a digital baseband signal and digital carrier phase information as a higher order address and a lower order address, respectively, and a second storage device for receiving a Q phase component of the digital baseband signal and the digital carrier phase information as a higher order address and a lower order address, respectively. The carrier phases of the carrier phase information applied to the first and the second storage devices are out of phase from each other by $\pi/2$. The first storage device outputs a multiplication result of the I phase component and a carrier signal and the second storage device outputs a multiplication result of the Q phase component and the carrier signal based on these addresses. These outputs are added to each other in a digital manner and then converted into an analog signal which is supplied as a modulated signal.

3 Claims, 5 Drawing Sheets

FIG. 5

| HIGHER ORDER ADDRESS | LOWER ORDER ADDRESS | STORAGE CONTENTS |
|---|---|---|
| BASEBAND SIGNAL | PHASE COUNTED VALUE (PHASE) | MULTIPLICATION DATA |
| A | 0 (0) | 0 (A x SIN 0) |
| B | 1 ($\pi/4$) | $B/\sqrt{2}$ (B x SIN $\pi/4$) |
| C | 2 ($\pi/2$) | C (C x SIN $\pi/2$) |
| D | 3 ($3\pi/4$) | $D/\sqrt{2}$ (D x SIN $3\pi/4$) |
| E | 4 ($\pi$) | 0 (E x SIN $\pi$) |
| F | 5 ($5\pi/4$) | $-F/\sqrt{2}$ (F x SIN $5\pi/4$) |
| G | 6 ($3\pi/2$) | $-G$ (G x SIN $3\pi/2$) |
| H | 7 ($7\pi/4$) | $-H/\sqrt{2}$ (H x SIN $7\pi/4$) |

DIGITAL QUADRATURE MODULATOR

BACKGROUND OF THE INVENTION

1. Field of the Invention

The present invention relates generally to digital quadrature modulators, and more particularly, to digital quadrature modulators used as MODEMs for digital communication equipments such as a land mobile radio telephone, a portable radio telephone and a cordless telephone.

2. Description of the Background Art

A conventional digital communication apparatus modulates a carrier signal in response to a digital information signal (baseband signal) to transmit the information signal in order to achieve efficient transmission.

Such modulation systems include an amplitude modulation system wherein an amplitude of a carrier signal is changed in response to a digital baseband signal (a modulating wave signal), a frequency modulating system wherein a frequency of a carrier is deviated in response to a modulating wave signal, a phase modulating system wherein a phase of a carrier is changed in response to a modulating wave signal and an amplitude phase modulating system wherein an amplitude and a phase of a carrier are individually changed in response to a modulating wave signal.

The carrier signal (modulated signal) S(t), modulated in response to a modulating wave signal, generally expressed by the following equations.

$$S(t) = A(t) \sin \{\omega_c t + \phi(t)\} \quad (1)$$
$$= A(t) \sin \phi(t) \cdot \cos \omega_c t +$$
$$A(t) \cos \phi(t) \cdot \sin \omega_c t$$

Herein, A(t) denotes an amplitude $W_c$ denotes a carrier frequency and $\phi(t)$ denotes a phase of a modulating wave signal.

As is clear from the above-described equation (1), the modulated signal can be represented by two components orthogonal to each other, that is, by a sum of an in-phase (I phase) component (the first term of the above-described equation (1)) and a quadrature phase (Q phase) component (the second term of the above-described equation (1)). Such a modulated signal can be therefore formed by using a quadrature modulator.

FIGS. 1 and 2 are a block diagram and a graph, respectively. These FIGURES, in combination, show the principle of such a quadrature modulator. It should be noted that the following example shows a phase modulating system for changing a phase of a carrier in response to a baseband signal, wherein an amplitude A (t) is fixed to "1".

With reference to FIG. 1, a mapping circuit 2 outputs I phase and Q phase components of a modulating wave signal as rectangular signals in response to a digital baseband signal applied through an input terminal 1. The I phase component is applied to one input of a multiplier 7 through a low pass filter (LPF) 3, while the Q phase component is applied to one input of a multiplier 8 through a low pass filter (LPF) 4.

A carrier signal $\cos\omega_c t$ is applied from a signal source 5 to the other input of the multiplier 7 which outputs an I phase component $\sin\phi(t)\cdot\cos\omega_c t$ of a modulated signal. A signal $\sin\omega_c t$ obtained by shifting the phase of the carrier signal from the signal source 5 by $\pi/2$ by means of a phase shift circuit 6 is applied to the other input of the multiplier 8 which outputs an Q phase component $\cos\phi(t)\cdot\sin\omega_c t$ of the modulated signal. The resulting I phase component and Q phase component can be represented in a one-to-one correspondence on the I and Q coordinates as shown in FIG. 2.

These I phase component and Q phase component are added to each other by an adder 9 to become such a modulated signal as expressed by equation (1), which signal is output from an output terminal 10.

FIG. 3 is a block diagram showing a GMSK (Gaussian filtered Minimum Shift Keying) modulator as an example of the quadrature modulator shown in FIG. 1. Such GMSK modulator is disclosed in, for example, "Differential Detection of GMSK Using Decision Feedback" by Abbas Yongacoglu et al., IEEE TRANSACTIONS ON COMMUNICATIONS, VOL. 36, No. 6, JUN. 1988, PP. 641–649 and "GMSK Modulation for Digital Mobile Radio Telephony" by Kazuaki Murota et al., IEEE TRANSACTIONS ON COMMUNICATIONS, VOL. COM-29, No.7, JULY 1981, pp. 1044–1050. In FIG. 3, the portion 2 surrounded by the chain dotted line shows the details of the structure corresponding to the mapping circuit 2 and LPFs 3 and 4 of FIG. 1.

First, a digital baseband signal applied through the input terminal 1 is applied to a gaussian filter 14. More specifically, the gaussian filter 14 comprise register 14a a binary counter 14b and a ROM-type low pass filter 14c. Shift register 14a takes the digital baseband signal R bits at a time and converts the R bits of digital baseband signal into R bit parallel data in response to a first clock signal applied from a clock signal source (not shown) through an input terminal 12 for every bit period T. The binary counter 14b counts and generates S bit data in response to a second clock signal applied from the clock, signal source (not shown) through an input terminal 13. The second clock signal has a frequency higher than that of the first clock signal. The ROM type low pass filter 14c from which is read L bit data indicating a phase shift amount $\Delta\phi(t)$ of a modulating wave signal. The filter 14c is accessed by the R bit output data of the shift register 14a as a higher order address and the S bit output data of the binary counter 14b as a lower order address.

The L bit data indicating the phase shift amount $\Delta\phi(t)$ is applied to an integration circuit 15 including an adder 15a and a one-clock delay unit 15b. The integration circuit 15 integrates the applied phase shift amount $\Delta\phi(t)$, outputs P bit data indicating the phase $\phi(t)$ of the modulating wave and applies the data to ROMs 16 and 17.

The ROM 16 includes a ROM table including I phase component data of the modulating wave signal ROM 16 generates the corresponding I phase component data of W bits in response to the data indicating the phase $\phi(t)$ from the integration circuit 15 as an address. The ROM 17 includes a ROM table including Q phase component data of the modulating wave signal ROM 17 generates the corresponding Q phase component data of W bits in response to the data indicating the phase $\phi(t)$ from the integration circuit 15 as an address.

The digital I phase component data output from the ROM 16 is converted into an analog I phase component signal $\sin\phi(t)$ by a D/A converter 18 and applied to one input of the multiplier 7 through the LPF 3'. The digital Q phase component data output from the ROM 17 is converted into an analog Q phase component signal cos$\phi$(t) by a D/A converter 19 and applied to one input of the multiplier 8 through the LPF 4'. The subsequent operation is the same as previously described in connection with FIG. 1 and the terminal 10 outputs the modulated signal expressed by equation (1).

Such a conventional quadrature modulator as shown in FIG. 3 is structured such that the digital modulating wave component data (the outputs of the ROMs 16 and 17) are once converted into analog modulating component signals by the D/A converters 18 and 19, which are multiplied by carrier signals in an analog manner. In such a structure, if the signal gains of the I phase component and Q phase component are different from each other in the stages subsequent to the LPFs 3 and 4 in FIG. 3, the spatial coordinates of the signal points are not located on the unit circle of a radius of $\sqrt{2}$ of FIG. 2 and the signal locus becomes an ellipse. In such a case, the accurate modulating wave signal components can not be obtained.

In addition, if the phases of two carrier components cos$\omega$ct and sin$\omega$ct whose phases are shifted by $\pi/2$ from each other are not precisely controlled, a satisfactory modulated signal can not be obtained.

In addition, since analog signal processing circuits are included, such circuit structure of the quadrature modulator as a whole can not be suitably made into an integrated circuit.

SUMMARY OF THE INVENTION

Therefore, an object of the present invention is to provide a digital quadrature modulator capable of obtaining a satisfactory modulated signal with ease.

Another object of the present invention is to provide a digital quadrature modulator structured by digital circuits and suitably made into an integrated circuit.

In short, the present invention includes a source for supplying a digital baseband signal, a source for supplying digital carrier information, first and second storage devices, a digital addition circuit and a D/A converter. The baseband signal source supplies a digital baseband signal divided into an in-phase signal component and a quadrature phase signal component. The carrier information source supplies information relating to a carrier signal as digital data. The first storage device stores data indicative of a result of multiplication of the corresponding in-phase signal component of the baseband signal and the corresponding carrier signal at an address designated by the in-phase signal component of the baseband signal and the corresponding carrier information. The second storage device stores data indicative of a result of multiplication of the corresponding quadrature phase signal component of the baseband signal and the corresponding carrier signal at an address designated by the quadrature phase signal component of the baseband signal and the carrier information. The digital additional circuit adds to a digital manner the data read from the first and the second storage devices based on the in-phase signal component and the quadrature phase signal component of the supplied baseband signal as well as the supplied carrier information. The D/A converter converts the output of the digital addition circuit into an analog modulated signal and supplied the modulated signal.

Since multiplications of an in-phase signal component and a quadrature phase signal component of a baseband signal with a carrier signal are performed in a digital manner, the present invention has the principal advantage in requiring no restrictive control of the gains of modulating wave components as well as the phases of two phase components of the carrier.

Since the whole quadrature modulator is formed of digital circuits, the present invention has another advantage in making a quadrature modulator into an IC with ease.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram showing one example of a table stored in first and second storage devices shown in FIG. 4.

DESCRIPTION OF THE PREFERRED EMBODIMENTS

Figure 1:
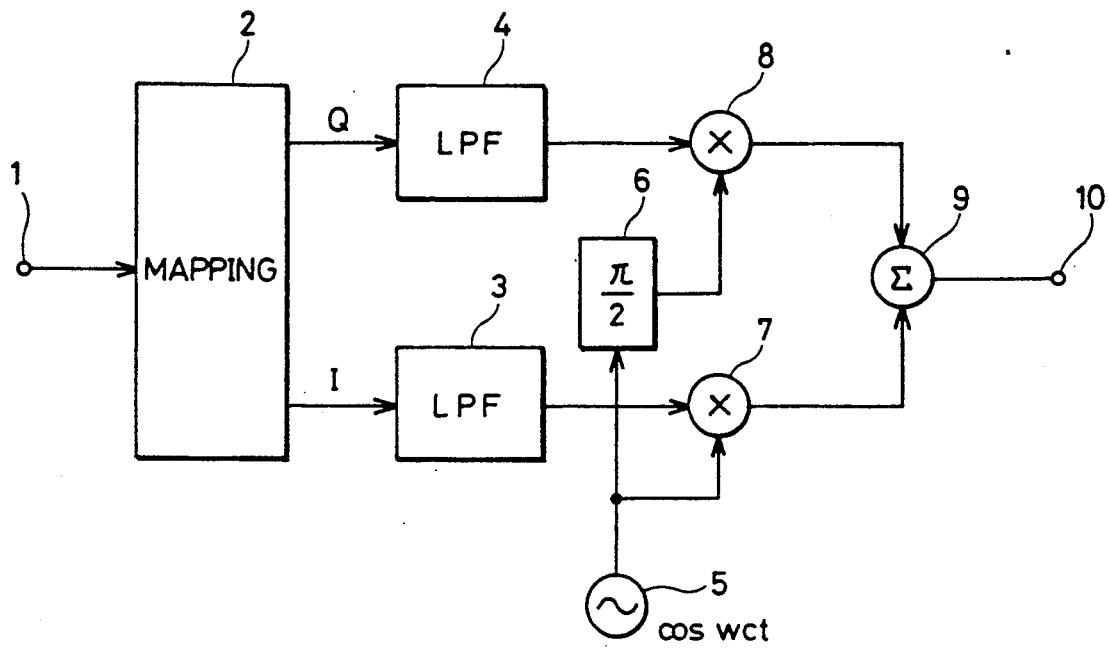
FIG. 1 is a block diagram schematically showing the principle of a quadrature modulator.
Figure 2:
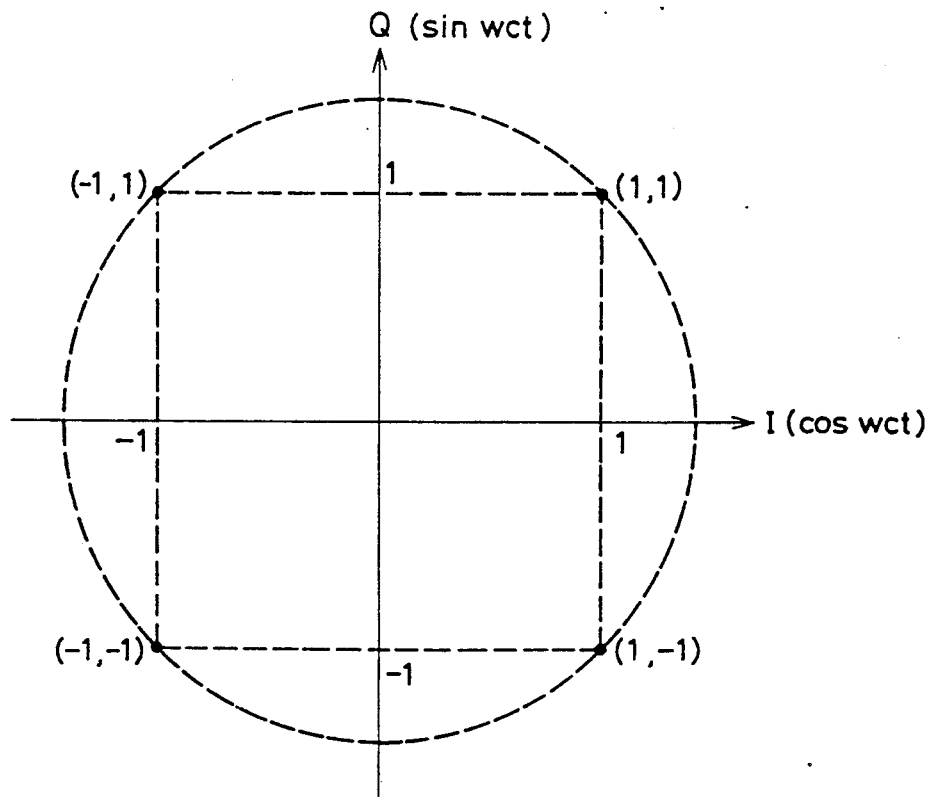
FIG. 2 is a graph schematically showing the principle of the quadrature modulator.
Figure 3:
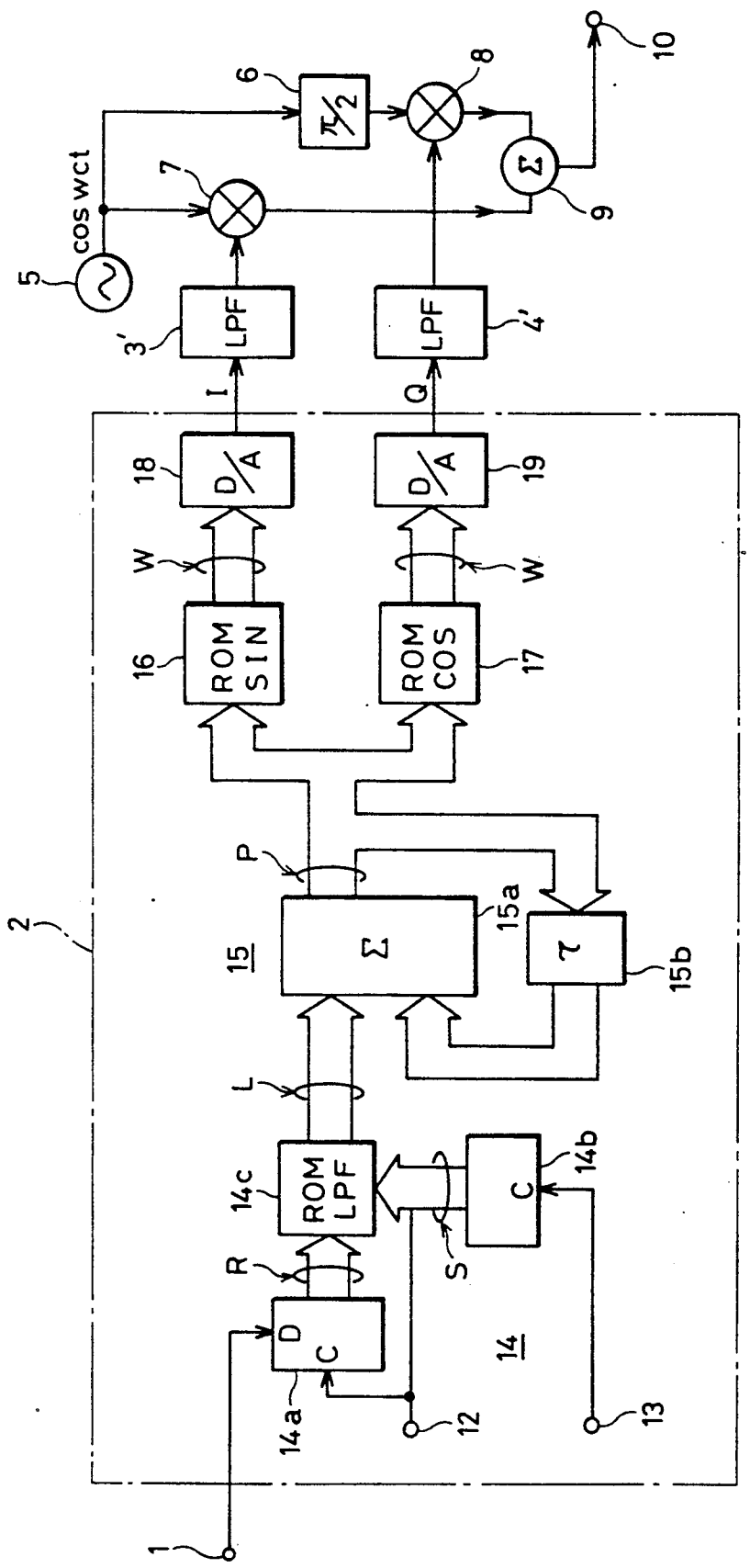
FIG. 3 is a block diagram showing a conventional GMSK modulator.
Figure 4:
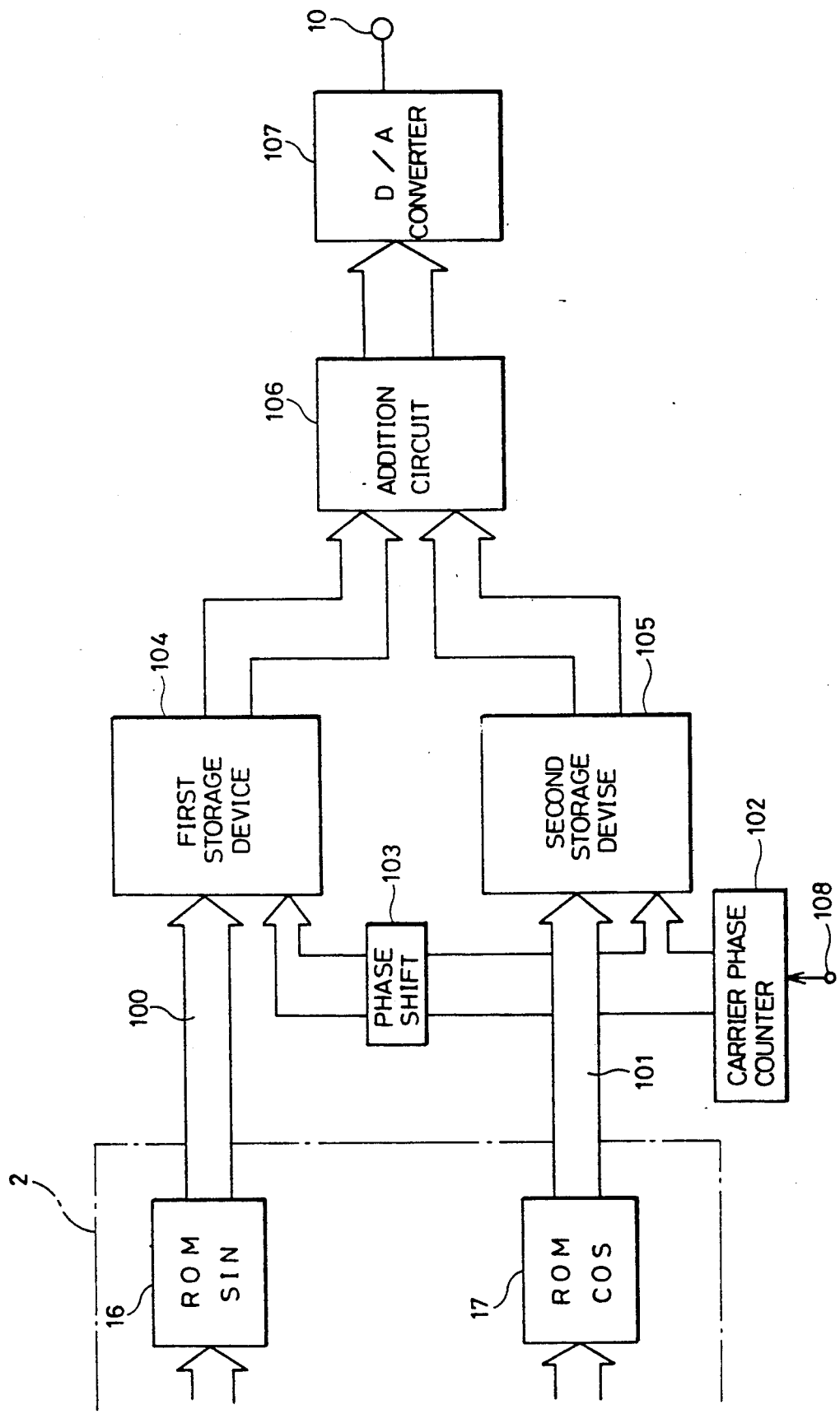
FIG. 4 is a block diagram showing a digital quadrature modulator according to one embodiment of the present invention.

FIG. 4 is a block diagram showing a digital quadrature modulator according to one embodiment of the present invention. With reference to FIG. 4, digital data of an in-phase (I phase) component of the baseband signal (modulating wave signal) output from the ROM 16 in the mapping circuit 2 shown in FIG. 3, for example, is supplied to a first storage device 104 through a data bus 100 as a higher order address. Digital data of a quadrature phase (Q phase) component of the baseband signal (modulating wave signal) output from the ROM 17 in the mapping circuit 2, for example, is supplied to a second storage device 105 through a data bus 101 as a higher order address.

A carrier phase counter 102 is a counter which counts based on a clock signal supplied from a signal source (not shown) through an input terminal 108. The clock signal has a frequency $2^n$ times that of the carrier signal. The counter is reset when the counted value reaches $2^n$. Additionally, the counter produces a signal indicative of phase information of the carrier signal. In other words, it is determined in advance that the output of the counter 102 indicates that the carrier phase is 0 when the counted value thereof is 0 and that the carrier phase is $2\pi$ when the counted value thereof is $2^n$.

Such output of the carrier phase counter 102 is supplied to the second storage device 105 as a lower order address. The output is also delayed by a $2^n/4$ clock period using a phase shift circuit 103 that is, the carrier phase is shifted by $\pi/2$, and supplied to the first storage device 104 as a lower order address.

The first and the second storage devices (ROM) 104 and 105 both store a table having such composition as shown in FIG. 5. The example shown in FIG. 5 shows storage data in a case where the above-described n is 3, that is, when the carrier phase counter 102 counts with the frequency 8 times that of the carrier signal.

More specifically, the left column of FIG. 5 shows digital data (A to H) each indicative of a baseband signal and supplied as a higher order address to each storage device. With each data having n bits, the baseband signal data takes $2^n$ values. The central column of FIG. 5 shows the output of the counter 102 each indicative of a carrier phase and supplied as a lower order address to each storage device. The right column of FIG. 5 shows the storage contents of each storage device. Each storage location in each storage device contains a multiplication result of an amplitude of a carrier in each carrier phase and a baseband signal.

The second storage device 105 therefore outputs data obtained by multiplying the Q phase component of the baseband signal by the amplitude of the carrier in the corresponding carrier phase. The multiplication is based on an address designated by Q phase component digital data (higher order address) of the baseband signal applied from the ROM 17 and the carrier phase (lower order address) which the output of the carrier phase counter 102 indicates. Assuming that the counted value of the counter 102 is 7 (that is, the phase of the carrier signal is $7\pi/4$) and the Q phase component of the baseband signal at that time is digital data H, for example, the stored data $H \times \sin 7\pi/4 = -H/\sqrt{2}$ is output from the second storage device 105 in accordance with the digital data H (higher order address) and the phase counted value 7 (lower order address).

Meanwhile, the first storage device 104 outputs data obtained by multiplying the I phase component of the baseband signal by the amplitude of the carrier in the corresponding carrier phase. The multiplication is based on an address designated by the I phase component digital data (higher order address) of the baseband signal applied from the ROM 16 and the carrier phase (lower order address) shifted by $\pi/2$ by the phase shift circuit 103. In other words, when the counted value of the counter 102 is 7 as described above, the counted value 5 (that is, the carrier phase of $5\pi/4$) is supplied to the lower order address of the first storage device 104. Consequently, if the I phase component of the baseband signal is digital data F at this time, the stored data $F \times \sin 5\pi/4 = -F/\sqrt{2}$ is output from the first storage device 104 in accordance with the digital data F (higher order address) and the phase counted value 5 (lower order address).

Referring to FIG. 4, the data output from the first and the second storage devices 104 and 105 are applied to a digital addition circuit 106 which adds these data in a digital manner to output digital data indicative of a modulated signal. The digital data is converted into an analog modulated signal by a D/A converter 107 to be output through the terminal 10.

As described above, one embodiment of the present invention multiplies the I phase component and the Q phase component of the baseband signal by the carrier signal in a digital manner. This embodiment avoids the necessity of strictly controlling the gains of the modulating wave components as well as the phases of the two phase components of an analog carrier wave as required in the prior art, thereby obtaining a satisfactory modulated signal with ease. A quadrature modulator as a whole can be structured using digital circuits, which facilitates implementation of the quadrature modulator as an integrated circuit.

While the embodiment shown in FIG. 4 is applied to a case where digital baseband signal components supplied from the ROMs 16 and 17 in the mapping circuit 2 of FIG. 3 are multiplied by carrier signal components, the present invention is also applicable to a quadrature modulator which produces a modulated signal by multiplying a baseband signal divided into an I phase component and a Q phase component by carrier signal components.

Figure 6:
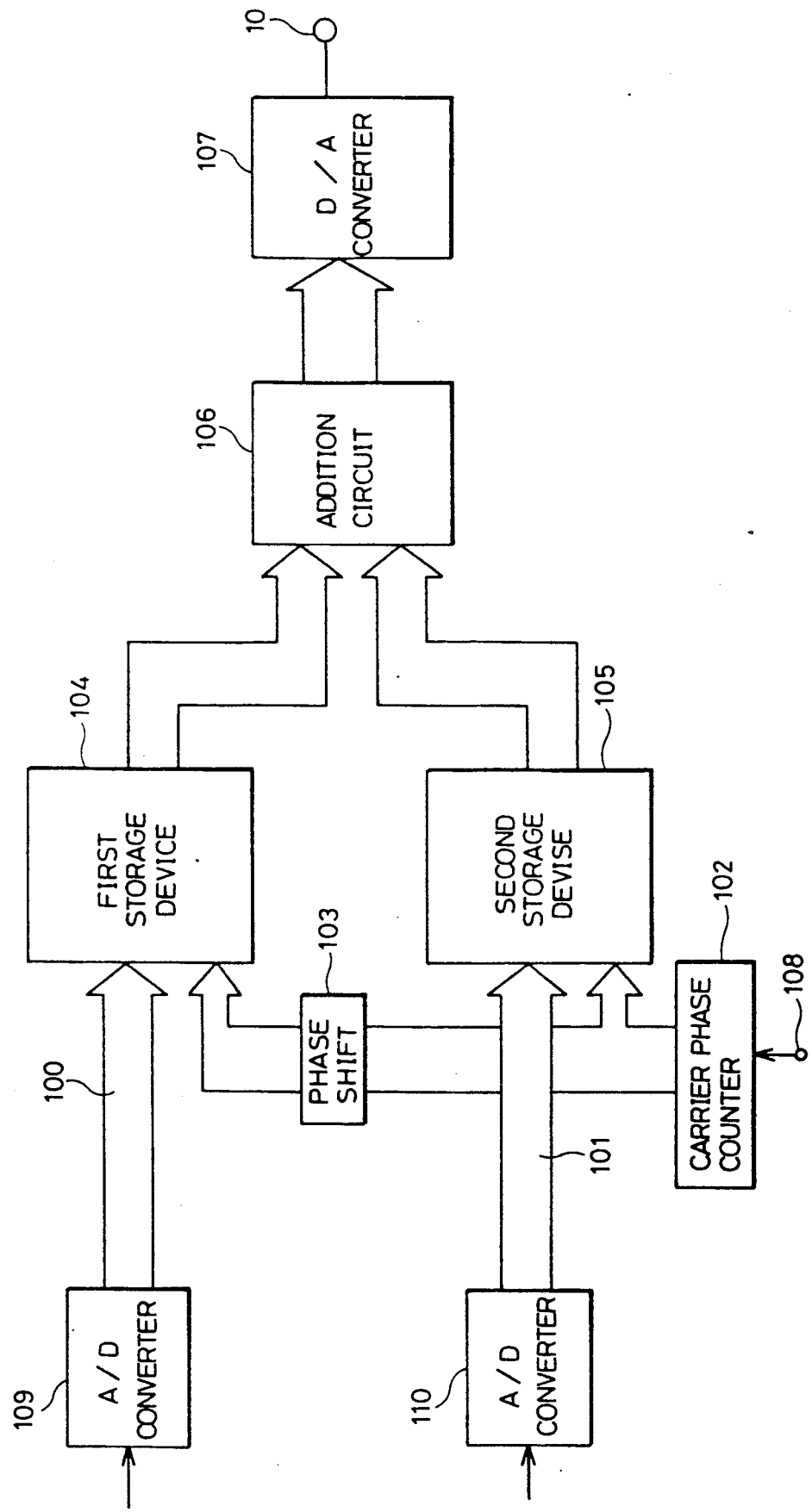
FIG. 6 is a block diagram showing another embodiment of the present invention.

For example, when the I phase component and the Q phase component of the baseband signal are supplied in the form of analog signals as shown in FIG. 6, the same effect can be obtained by converting respective I phase and Q phase signals into digital signals using A/D converters 109 and 110 and then supplying the digital signals to the respective higher order addresses of the first and the second storage devices 104 and 105.

According to the embodiment shown in FIG. 4, the first and second storage devices 104 and 105 are adapted to have the same storage contents. However, if these storage devices 104 and 105 store the data different from each other by $\pi/2$ in the carrier phase, it is not necessary to shift the carrier phase by $\pi/2$ prior to applying the carrier phase to these storage devices as lower order addresses. As a result, in such a case, the phase shift circuit 103 shown in FIG. 4 can be eliminated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital quadrature modulator comprising:
    means for supplying a digital baseband signal divided into an in-phase signal component and a quadrature phase signal component,
    means for supplying digital data representing a phase of a carrier signal,
    first storing means for storing a plurality of first data values, wherein each of said first data values is indicative of a result of multiplying a first value representing an in-phase signal component of a baseband signal with a second value representing a phase of a carrier signal, each of said first data values being stored at an address within said first storing means,
    second storing means for storing a plurality of second data values, wherein each of said second data values is indicative of a result of multiplying a third value representing a quadrature signal component of a baseband signal with the second value representing a phase of a carrier signal, each of said second data values being stored at an address within said second storing means,
    means for reading, in response to said in-phase component of said supplied baseband signal and said supplied digital data representing said carrier phase, said first data values from said first storing means,
    means for reading, in response to said quadrature phase component of said supplied baseband signal and said supplied digital data representing said carrier phase, said second data values from said second storing means,
    means for digitally adding the first and second data values respectively read from said first and second storing means so as to form an output, and
    means for converting the output of said digital adding means into an analog signal to yield a modulated signal.

2. The digital quadrature modulator according to claim 1, wherein said digital data supplying means comprises:

counter means, driven by a clock signal having a frequency higher than that of said carrier signal, for supplying a counted value as first digital phase data indicative of the phase of said carrier signal, and phase shift means for shifting a phase of the first digital phase data supplied from said counter means by $\pi/2$ to yield second digital phase data.

3. The digital quadrature modulator according to claim 2, wherein the in-phase signal component of said supplied baseband signal and said second digital phase data are supplied to said first storing means as an address for each of said plurality of first data values stored therein, and the quadrature phase signal component of said supplied baseband signal and said first digital phase data are supplied to said second storing means as an address for each of said plurality of second data values stored therein.

* * * * *